United States Patent
Zhu

(10) Patent No.: US 10,978,927 B2
(45) Date of Patent: Apr. 13, 2021

(54) GENERATOR STATOR AND GENERATOR

(71) Applicant: Schaeffler Technologies AG & Co. KG, Herzogenaurach (DE)

(72) Inventor: Ganjun Zhu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 52 days.

(21) Appl. No.: 16/092,941

(22) PCT Filed: Apr. 14, 2017

(86) PCT No.: PCT/CN2017/080509
§ 371 (c)(1),
(2) Date: Oct. 11, 2018

(87) PCT Pub. No.: WO2017/177954
PCT Pub. Date: Oct. 19, 2017

(65) Prior Publication Data
US 2019/0173345 A1    Jun. 6, 2019

(30) Foreign Application Priority Data

Apr. 15, 2016 (CN) .......................... 201610236640.1

(51) Int. Cl.
| | | |
|---|---|---|
| *H02K 16/04* | (2006.01) | |
| *H02K 3/28* | (2006.01) | |
| *H02K 1/12* | (2006.01) | |
| *H02K 3/18* | (2006.01) | |
| *H02K 16/00* | (2006.01) | |
| *H02K 7/18* | (2006.01) | |
| *H02K 11/04* | (2016.01) | |
| *B60L 50/00* | (2019.01) | |
| *B61C 3/00* | (2006.01) | |

(52) U.S. Cl.
CPC ................. *H02K 3/28* (2013.01); *H02K 1/12* (2013.01); *H02K 3/18* (2013.01); *H02K 7/1846* (2013.01); *H02K 11/046* (2013.01); *H02K 16/00* (2013.01); *H02K 16/04* (2013.01); *B60L 50/00* (2019.02); *B61C 3/00* (2013.01)

(58) Field of Classification Search
CPC ................................ H02K 16/04; H02K 3/28
See application file for complete search history.

(56) References Cited

U.S. PATENT DOCUMENTS

| | | | |
|---|---|---|---|
| 8,710,708 B2 * | 4/2014 | Dooley ................ | H02K 21/222 310/112 |
| 2007/0013261 A1 | 1/2007 | Shichijo et al. | |
| 2008/0297088 A1 | 12/2008 | Steimer | |
| 2012/0217746 A1 | 8/2012 | Groendahl et al. | |
| (Continued) | | | |

FOREIGN PATENT DOCUMENTS

| | | |
|---|---|---|
| CN | 101527469 A | 9/2009 |
| CN | 101741174 A | 6/2010 |
| (Continued) | | |

*Primary Examiner* — Ramon M Barrera
(74) *Attorney, Agent, or Firm* — Kevin L. Parks

(57) ABSTRACT

A generator stator used in applications where rotational speed of a rotary body varies over a wide range and a generator having a stator. The generator stator having at least two coil sets formed by winding wires, the at least two coil sets are independent of each other to form power outputs independent of each other.

9 Claims, 5 Drawing Sheets

(56) References Cited

U.S. PATENT DOCUMENTS

| | | |
|---|---|---|
| 2013/0320938 A1 | 12/2013 | Deng et al. |
| 2014/0340013 A1 | 11/2014 | Li et al. |
| 2016/0036280 A1 | 2/2016 | Matt et al. |

FOREIGN PATENT DOCUMENTS

| | | | |
|---|---|---|---|
| CN | 101860154 A | 10/2010 | |
| CN | 102005884 A | 4/2011 | |
| CN | 102130544 A | 7/2011 | |
| CN | 102412638 A | 4/2012 | |
| CN | 103001423 A | 3/2013 | |
| CN | 105449962 A | 3/2016 | |
| EP | 2685602 A1 * | 1/2014 | ............. H02K 16/04 |
| JP | S6377358 A | 4/1988 | |
| WO | 84003400 A1 | 8/1984 | |
| WO | 20090119864 A1 | 10/2009 | |
| WO | 20140192608 A1 | 12/2014 | |

* cited by examiner

GENERATOR STATOR AND GENERATOR

CROSS REFERENCE TO RELATED APPLICATION

The present application claims the priority of Chinese Patent Application No. 201610236640.1, filed on 15 Apr. 2016 and entitled "Generator stator and generator", which is incorporated herein by reference in its entirety.

TECHNICAL FIELD

The present disclosure relates to the field of generators, and in particular to a generator stator and a generator comprising the stator.

BACKGROUND

For a traditional generator, a single wire is usually used to be wound into a coil of each phase of the generator (a single-phase output generator and/or a three-phase output generator), and therefore each phase has only one electric power output, i.e. a single voltage/current output. The power/voltage/current output is processed by an additional control apparatus, for example, a printed circuit board (PCB).

Each phase of the coil configuration in the traditional generator has only single power/voltage/current output, which limits the application of the generator in a railway vehicle. In the generator of the railway vehicle, the generator is driven by a rotary component (such as, a shaft and an axle) in the vehicle. The output power depends on the rotational speed of the rotary components and the higher the rotational speed, the greater the output power.

In the railway vehicle application, the speed of a vehicle may be tens of kilometers per hour to hundreds of kilometers per hour, and the generator may generate a wide range of output power. Therefore, the direct output power/voltage/current varies over a wide range.

It is difficult to process the output in a constant way by means of the control apparatus. Generally, the control apparatus can only process relatively small changes in the input voltage.

In particular, in the generator in an axle box of the railway vehicle, the output power may exceed a load limit. In this case, a particularly complex power management scheme is required to inhibit the generation of the power, so as to protect the generator and the control apparatus.

SUMMARY

In consideration of the above defects of the prior art, the present disclosure provides a generator stator that can be applied to an application where the rotational speed of a rotary body varies over a wide range, and a generator comprising the stator.

The present disclosure may use, but not limited to, the following solutions.

The present disclosure provides a generator stator, comprising at least two coil sets formed by winding wires, wherein the at least two coil sets are independent of each other to form power outputs independent of each other.

Optionally, each of the coil sets comprises a coil, constituting a single-phase power output of a single-phase output generator.

Preferably, the generator stator further comprises a stator core, the at least two coil sets being wound around the same stator core.

Optionally, each of the coil sets comprises three coils, constituting a three-phase power output of a three-phase output generator.

Preferably, the generator stator further comprises a stator core, the different coil sets being arranged at different circumferential positions of the same stator core.

Optionally, the generator stator further comprises a stator core, the different coil sets being arranged at positions in the same circumferential direction but different radial directions of the same stator core.

Optionally, the generator stator comprises a stator core, the different coil sets being arranged at different axial positions of the same stator core, respectively; or the generator stator comprises a plurality of stator cores, the different coil sets being respectively arranged on the different axially-staggered stator cores.

Optionally, the generator stator comprises a plurality of stator cores, the different coil sets being arranged on the stator cores which are overlapped as viewed in the radial direction but have different radial dimensions.

The present disclosure further provides a generator, which comprises the generator stator according to the present disclosure.

Optionally, the generator comprises a rotor and a plurality of stators sharing the rotor.

Preferably, the generator further comprises control units and a control apparatus, wherein the power outputs of the different coil sets are connected to the same control apparatus via the different control units, and the control units are configured to control, independently of each other, an on/off state of the power outputs of the different coil sets that are connected to the control apparatus.

Preferably, the control units are switches, and the control apparatus is a current-rectifying and voltage-stabilizing apparatus.

The generator stator of the present disclosure can be applied to applications, such as a railway vehicle, where the rotational speed of a rotary component thereof varies over a wide range, which can generate a safe output that does not exceed the limits of an electrical load and the generator, and can effectively prevent overloading of the generator and the control apparatus. More particularly, the control can be performed according to the rotational speed of the rotor, and in the case where the rotational speed of the rotor varies over a wide range, a relatively stable power output can still be generated by means of the control of the control apparatus.

| Description of Reference Signs | |
|---|---|
| 200 Stator core | 100 Coil |
| 201 Stator core | 10 First coil  20 Second coil  30 Third coil |
| 300, 301, 302 Stator core | |
| 900, 901 Rotor | 401, 402, 403, 404 Stator |
| K1 to K9 Switch | 50, 500 Control apparatus |

DETAILED DESCRIPTION

Figure 1:
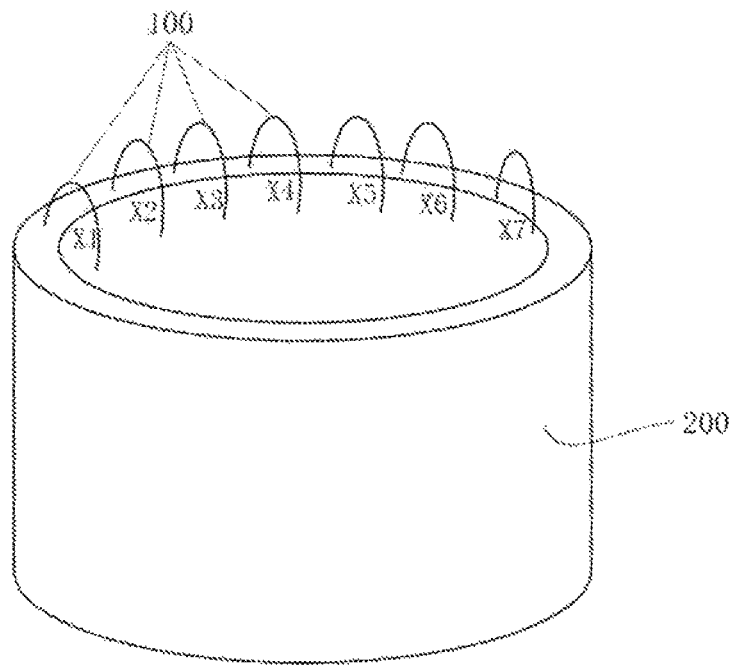
FIG. 1 shows a schematic diagram of a generator stator according to the prior art.

As shown in FIG. 1, in the generator stator according to the prior art, in a stator core 200, a single wire is wound into a coil 100 of one phase of the generator. FIG. 1 shows the coil at seven positions, i.e., at portions X1, X2, X3, X4, X5, X6, and X7 in the stator core 200.

Figure 2:
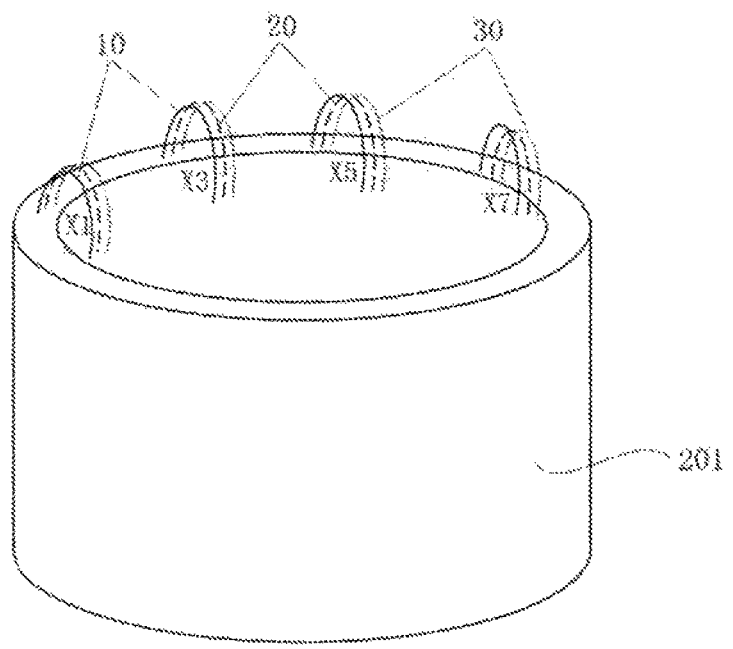
FIG. 2 shows a schematic diagram of a generator stator according to a first embodiment of the present disclosure.

In the present disclosure, as shown in FIG. 2, in a stator core 201, two or more unconnected wires are wound together to form coils of one phase (two or more coil sets), wherein the two or more wires (coils) are subjected to the same magnetic flux change, generating mutually independent electrical outputs of the same phase.

Specifically, FIG. 2 shows that three unconnected wires (independent of each other/insulated from each other) form constitute the coils of one phase of the generator, that is, a first coil 10, a second coil 20, and a third coil 30 can be respectively arranged at the portions X1, X2, X3, X4, X5, X6 and X7 in FIG. 1 (FIG. 2 merely shows the coils at the portions X1, X3, X5, and X7 for the sake of clarity). Therefore, three electrical outputs independent of each other can be generated.

The coils 10, 20, and 30 may have the same length (the same number of turns) and/or wire diameter, to generate the same output power/voltage/current. Alternatively, the coils 10, 20, and 30 may have different lengths and/or wire diameters to generate different output powers/voltages/currents.

The generator stator of the present disclosure can be applied to different types of generators, that is, the generator stator can not only be applied to a single-phase output generator, but also to a three-phase output generator.

Figure 3:
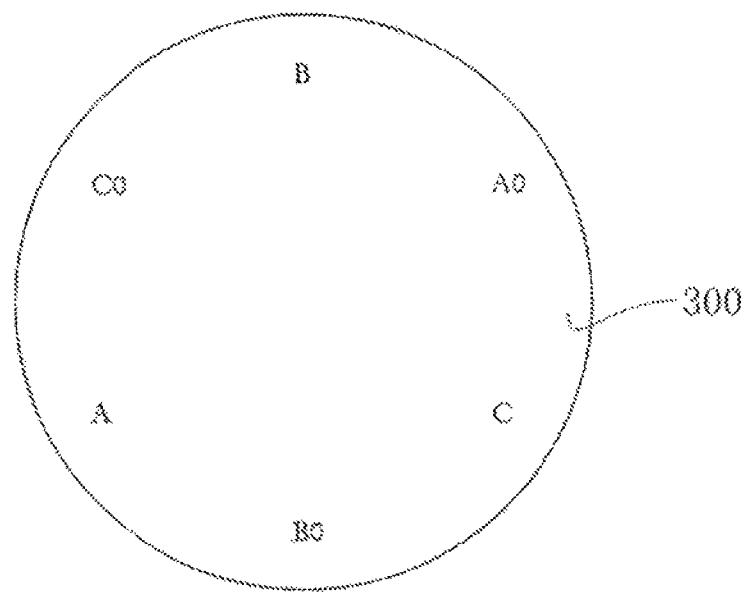
FIG. 3 shows a schematic diagram of another generator stator according to the prior art.

FIG. 3 shows a schematic diagram of a three-phase output generator according to the prior art. As shown in FIG. 3, in a stator core 300, an A-phase, a B-phase, and a C-phase coils are spaced apart from each other by 120 degrees in the circumferential direction of the stator core 300. In the coil configuration of the stator, a star connection method may be used, that is, one end of each of the A-phase, B-phase, and C-phase coils respectively generates an A-phase output, a B-phase output and a C-phase output, and the three coils are connected together at the other end, that is, points A0, B0 and C0, with a common point thereof leading to a neutral line. Of course, in the coil configuration of the stator, a delta connection method may also be used.

In the coil configuration of the stator, the A-phase, B-phase, and C-phase coils constitute a coil set.

Figure 4:
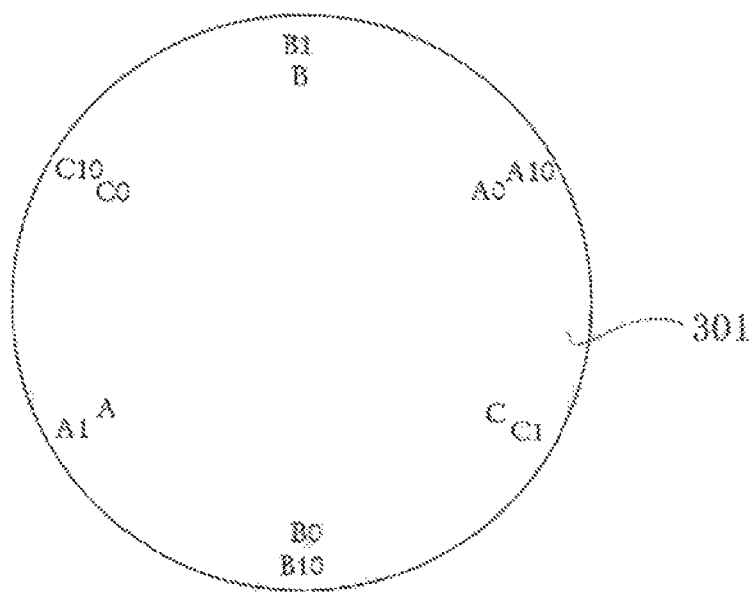
FIG. 4 shows a schematic diagram of a generator stator according to a second embodiment of the present disclosure.

With reference to FIG. 4, two coil sets are included in the second embodiment of the generator stator in the present disclosure. A first coil set comprises an A-phase, a B-phase, and a C-phase coil, the three coils constituting a three-phase power output of a three-phase output generator. A second coil set comprises an A1-phase, a B1-phase, and a C1-phase coil, the three coils constituting another three-phase power output of the three-phase output generator. The two three-phase outputs are independent of each other. The first coil set and the second coil set are stacked and wound around the same stator core 301.

More particularly, in addition to the arrangement of the A-phase, B-phase, and C-phase coils at the positions as shown in FIG. 3, the A1-phase coil is arranged at the position of the A-phase coil in a stacked manner, the B1-phase coil is arranged at the position of the B-phase coil in a stacked manner, and the C1-phase coil is arranged at the position of the C-phase coil in a stacked manner. The A-phase coil and the A1-phase coil, the B-phase coil and the B1-phase coil, and the C-phase coil and the C1-phase coil are respectively not connected (independent of each other/ insulated from each other). Taking the star connection method as an example, A0, B0, and C0 are connected together and lead to a neutral line, and A10, B10, and C10 are connected together and lead to another neutral line. That is to say, in the stator of the second embodiment, two sets of three-phase outputs (six outputs) are led out.

As described above, the A-phase coil and the A1-phase coil may be arranged at different positions in the radial direction but at the same circumferential position of the stator core 301. The same is true for the B-phase coil and the B1-phase coil, and the C-phase coil and the C1-phase coil. The A1-phase, B1-phase, and C1-phase coils are also spaced apart from each other by 120 degrees in the circumferential direction of the stator core 301.

Figure 5:
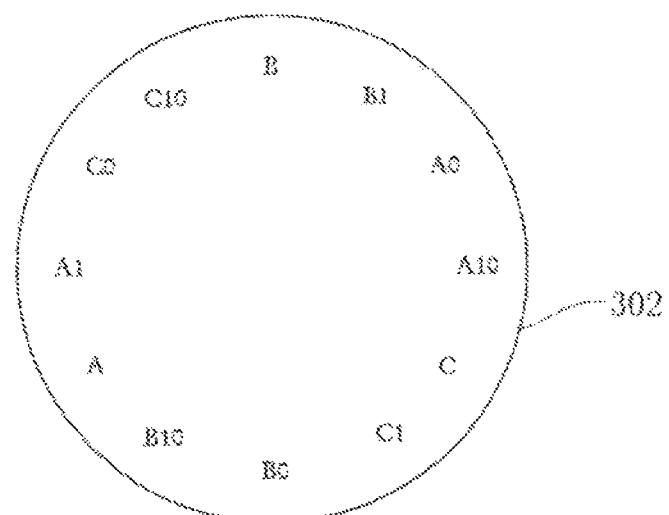
FIG. 5 shows a schematic diagram of a generator stator according to a third embodiment of the present disclosure.

With reference to FIG. 5, two coil sets are included in the third embodiment of the generator stator in the present disclosure. A first coil set comprises an A-phase, a B-phase, and a C-phase coil, the three coils constituting a three-phase power output of a three-phase output generator. A second coil set comprises an A1-phase, a B1-phase, and a C1-phase coil, the three coils constituting another three-phase power output of the three-phase output generator. The two three-phase outputs are independent of each other. The two coil sets are arranged at different circumferential positions of the same stator core 302.

More particularly, in addition to the arrangement of the A-phase, B-phase, and C-phase coils at the positions as shown in FIG. 3, the A1-phase coil is arranged at a position staggered with respect to the position of the A-phase coil in the circumferential direction of the stator core 302, the B1-phase coil is arranged at a position staggered with respect to the position of the B-phase coil in the circumferential direction of the stator core 302, and the C1-phase coil is arranged at a position staggered with respect to the position of the C-phase coil in the circumferential direction of the stator core 302. The A-phase coil and the A1-phase coil, the B-phase coil and the B1-phase coil, and the C-phase coil and the C1-phase coil are respectively not connected (independent of each other/insulated from each other). Taking the star connection method as an example, A0, B0, and C0 are connected together and lead to a neutral line, and A10, B10, and C10 are connected together and lead to another neutral line. That is to say, in the coil configuration of the third embodiment, two sets of three-phase outputs (six outputs) are led out.

The A1-phase, B1-phase, and C1-phase coils are also spaced apart from each other by 120 degrees in the circumferential direction of the stator core 302.

Of course, according to the number of magnetic poles in the rotor of the generator, coils can be arranged at more positions of the stator core. In the embodiments of FIG. 4 and FIG. 5, three, four or more sets of three-phase outputs (i.e. nine, twelve or more outputs) may be output by changing the number of sets of coils. Moreover, the coil configurations as shown in FIGS. 4 and 5 may be used in combination.

Briefly, the present disclosure can be understood as configuring a plurality of sets of prior art coils independent of each other in one stator, or it can be understood that one generator of the present disclosure is equivalent to a plurality of generators in the prior art, wherein the plurality of generators share a rotor, and further, the coils of the plurality of generators share a stator core.

Figure 6:
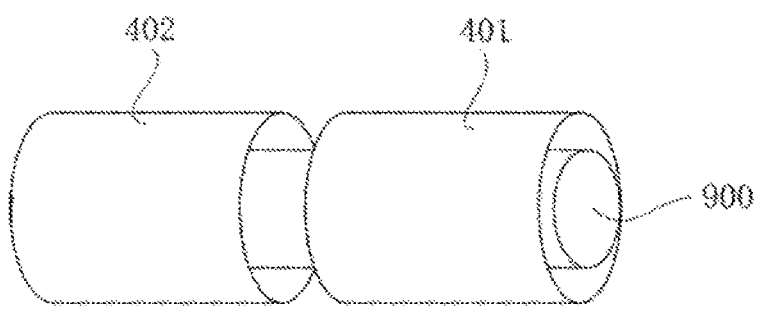
FIG. 6 shows a schematic diagram of a generator stator according to a fourth embodiment of the present disclosure.

With reference to FIG. 6, in the generator according to the fourth embodiment of the present disclosure, two stators 401, 402 are arranged around the same rotor 900, and the stators 401 and 402 are arranged at different axial positions of the rotor 900. The stators 401 and 402 may be stators in the prior art, or may be stators according to the first to third embodiments of the present disclosure. The outputs of the stators 401 and 402 are independent of each other. In the generator, different coil sets are arranged on the different axially-staggered stator cores.

It can be understood that the different coil sets may also be arranged at axially-staggered positions of the same stator core.

Figure 7:
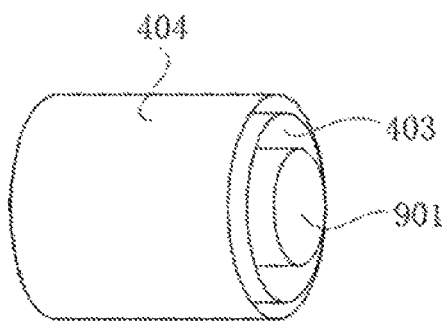
FIG. 7 shows a schematic diagram of a generator stator according to a fifth embodiment of the present disclosure.

With reference to FIG. 7, in the generator according to the fifth embodiment of the present disclosure, two stators 403, 404 are concentrically arranged around the same rotor 900, and the stator 404 is fitted over the stator 403. The stators 403 and 404 are arranged at the same axial position of the rotor 900. The stators 403 and 404 may be stators in the prior art, or may be stators according to the first to third embodiments of the present disclosure. The outputs of the stators 403 and 404 are independent of each other. In the generator, the different coil sets are arranged on the stator cores which are overlapped as viewed in the radial direction but have different radial dimensions.

Figure 8:
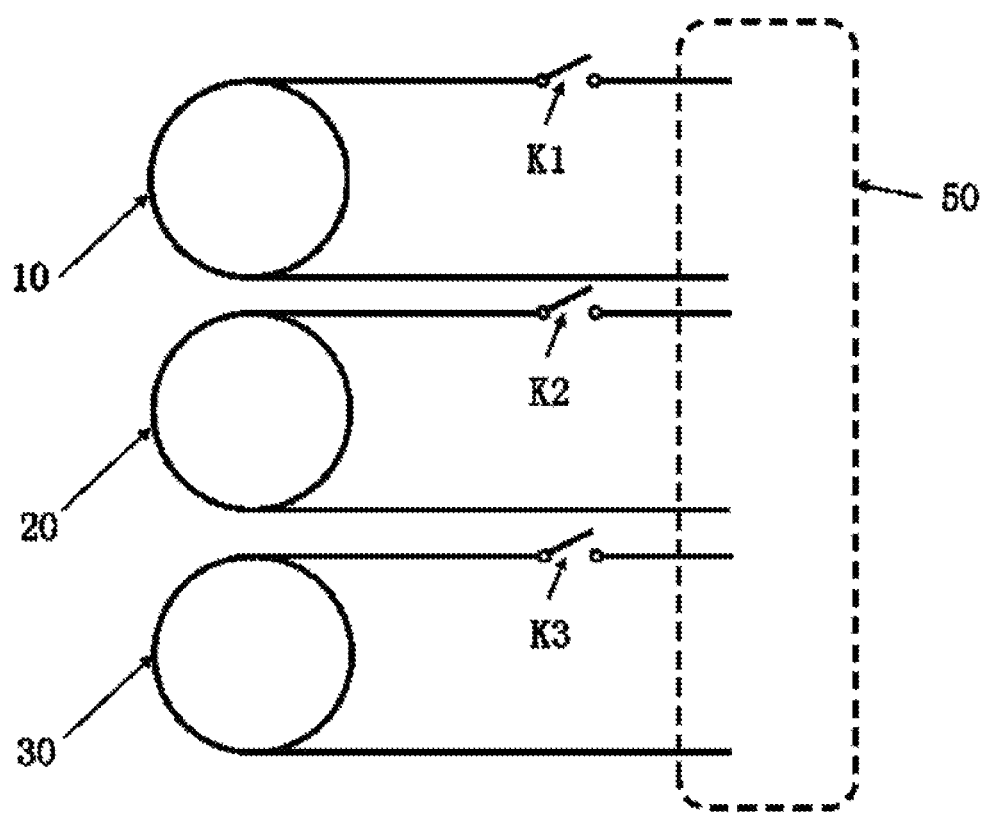
FIG. 8 shows a schematic diagram of another generator stator according to the present disclosure.

FIG. 8 shows a schematic diagram of a generator according to the present disclosure in which the stator shown in FIG. 2 may be employed. An output of the first coil 10 is connected to the control apparatus 50 via a switch K1, an output of the second coil 20 is connected to the control apparatus 50 via a switch K2, and an output of the third coil 30 is connected to the control apparatus 50 via a switch 30. When the rotational speed of the rotor of the generator is large, the current generated in each of the first coil 10 to the third coil 30 is also large, and when the current exceeds a predetermined threshold, one or two of the switches K1, K2, K3 may be turned off to prevent overloading of the control apparatus. In particular, the control apparatus 50 may be a current-rectifying and voltage-stabilizing apparatus.

Figure 9:
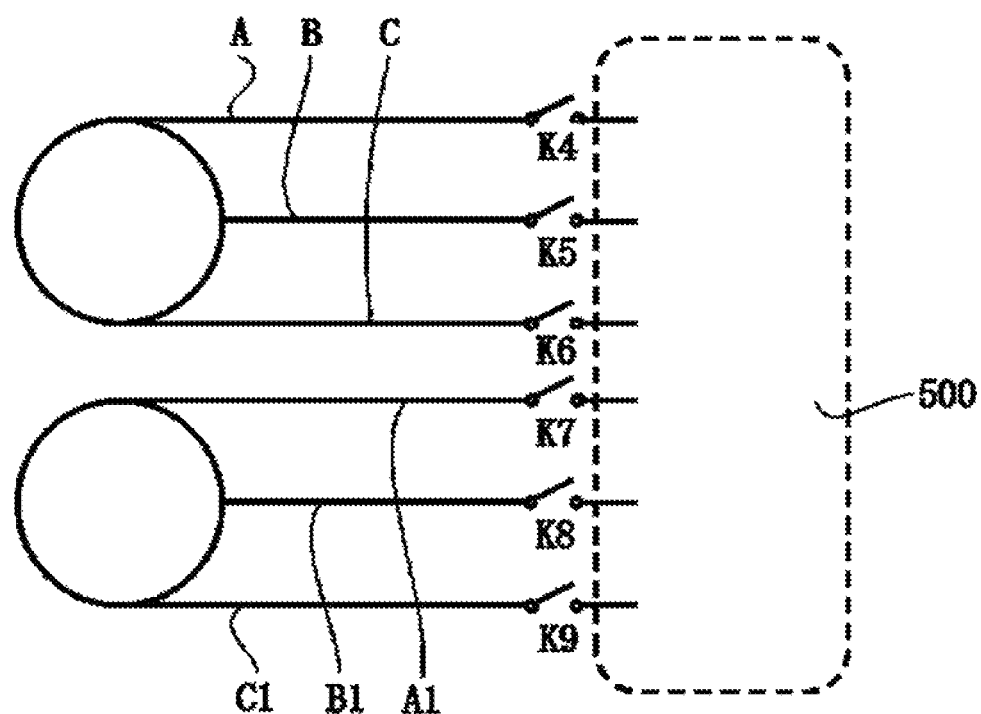
FIG. 9 shows a schematic diagram of yet another generator stator according to the present disclosure.

FIG. 9 shows a schematic diagram of a generator according to the present disclosure in which the stator shown in FIGS. 4 to 7 may be employed. The A-phase output of the A-phase coil is connected to the control apparatus 500 via a switch K4, the B-phase output of the B-phase coil is connected to the control apparatus 500 via a switch K5, and the C-phase output of the C-phase coil is connected to the control apparatus 500 via a switch K6. Similarly, the A1-phase, B1-phase, and C1-phase outputs of the A1-phase, B1-phase, and C1-phase coils are connected to the control apparatus 500 via switches K7, K8, and K9, respectively. When the rotational speed of the rotor of the generator is large, the current generated in each phase coil is also large, and when the current exceeds a predetermined threshold, the switches K4, K5, K6 or the switches K7, K8, K9 may be turned off to prevent overloading of the control apparatus 500. Preferably, the switches K4, K5, K6 may be a set of synchronous switches, and the switches K7, K8, K9 may be another set of synchronous switches. In this way, the opening and closing operations of the switches can be simplified. In particular, the control apparatus 500 may also be a current-rectifying and voltage-stabilizing apparatus.

Of course, the generator stator and the generator of the present disclosure are not limited to use in railway vehicles, but can also be applied to other vehicles and any other applications where the rotational speed of a rotary component varies over a wide range.

The generator stator of the present disclosure can be applied to applications, such as a railway vehicle, where the rotational speed of a rotary component thereof varies over a wide range, which can generate a safe output that does not exceed the limits of an electrical load and the generator, and can effectively prevent overloading of the generator and the control apparatus.

The present disclosure is not limited to the aforementioned specific embodiments. Under the teaching of the present disclosure, a person skilled in the art can make various modifications or variations to the present disclosure without departing from the scope of the present disclosure.

The invention claimed is:

1. A generator stator, comprising:
   at least two coil sets formed by winding wires,
      wherein the at least two coil sets are independent of each other to form power outputs independent of each other,
      wherein each of the coil sets comprises three coils, constituting a three-phase power output of a three-phase output generator,
      wherein at least one of the three coils from a first one of the coil sets is disposed between two of the three coils from a second one of the coil sets in a circumferential direction.

2. The generator stator of claim 1, further comprising a ring-shaped stator core, the different coil sets being arranged at different circumferential positions of the same stator core.

3. A generator, comprising:
   a first generator stator as claimed in claim 1, and
   a rotor.

4. The generator according to claim 3, further comprising control units and a control apparatus, wherein the power outputs of the different coil sets are connected to the same control apparatus via the different control units, and the control units are configured to control, independently of each other, the on-off state of the power outputs of the different coil sets that are connected to the control apparatus.

5. The generator according to claim 4, wherein the control units are switches, and the control apparatus is a rectifying and voltage stabilizing apparatus.

6. The generator of claim 3, further comprising a second generator stator as claimed in claim 1, wherein the first generator stator and the second generator stator share the rotor.

7. The generator of claim 6, wherein the second generator stator is axially offset from the first generator stator.

8. The generator of claim 6, wherein the second generator stator overlaps the first generator stator as viewed in a radial direction.

9. The generator of claim 6, wherein the second generator stator has a different radial dimension than the first generator stator.

\* \* \* \* \*